United States Patent
Frank et al.

(10) Patent No.: US 9,942,768 B1
(45) Date of Patent: Apr. 10, 2018

(54) VERIFYING A USER UTILIZING GYROSCOPIC MOVEMENT

(71) Applicant: International Business Machines Corporation, Armonk, NY (US)

(72) Inventors: Brandon Z. Frank, Princeton, NJ (US); Joseph A. Latone, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/283,093

(22) Filed: Sep. 30, 2016

(51) Int. Cl.
*H04M 1/66* (2006.01)
*H04M 1/68* (2006.01)
*H04M 3/16* (2006.01)
*H04W 12/12* (2009.01)
*H04L 12/26* (2006.01)
*H04L 29/08* (2006.01)
*G06F 21/31* (2013.01)
*G06F 3/01* (2006.01)

(52) U.S. Cl.
CPC ............ *H04W 12/12* (2013.01); *G06F 3/017* (2013.01); *G06F 21/31* (2013.01); *H04L 43/16* (2013.01); *H04L 67/306* (2013.01); *G06F 2221/2133* (2013.01)

(58) Field of Classification Search
CPC ... G06F 21/31; G06F 2221/2133; G06F 3/017
USPC ............ 455/566, 556.1, 556.2, 410, 411
See application file for complete search history.

(56) References Cited

U.S. PATENT DOCUMENTS

| | | | |
|---|---|---|---|
| 8,214,891 B2 | 7/2012 | Seacat | |
| 8,601,538 B2 | 12/2013 | Ovarfordt et al. | |
| 8,776,173 B2 | 7/2014 | Paxton et al. | |
| 8,826,382 B2 | 9/2014 | Sanghavi | |
| 9,141,779 B2 | 9/2015 | Shen et al. | |
| 2012/0007713 A1* | 1/2012 | Nasiri ................. | G06F 1/1694 340/5.81 |
| 2013/0057496 A1* | 3/2013 | Hong ................... | G06F 3/0488 345/173 |
| 2013/0179958 A1* | 7/2013 | Fujiwara ............. | G06F 21/36 726/7 |
| 2013/0314204 A1* | 11/2013 | Ho ...................... | G05B 1/00 340/5.2 |
| 2014/0065960 A1* | 3/2014 | Gang .................. | H04B 5/0031 455/41.1 |
| 2014/0187204 A1* | 7/2014 | Hartmann ........... | G06F 21/316 455/411 |

(Continued)

FOREIGN PATENT DOCUMENTS

WO  2014185861 A1  11/2014

OTHER PUBLICATIONS

Liao et al., "A Game and Accelerometer-Based CAPTCHA Scheme for Mobile Learning System," Proceedings of EdMedia: World Conference on Educational Media and Technology, 2013, pp. 1-6.

(Continued)

*Primary Examiner* — Edward Urban
*Assistant Examiner* — Rui Hu
(74) *Attorney, Agent, or Firm* — Zilka-Kotab, P.C.

(57) ABSTRACT

A computer-implemented method according to one embodiment includes requesting input from a user of a mobile device, receiving gyroscope data at the mobile device, in response to the requesting, verifying the gyroscope data, and performing one or more actions, in response to the verifying.

18 Claims, 5 Drawing Sheets

(56) References Cited

U.S. PATENT DOCUMENTS

| | | | | |
|---|---|---|---|---|
| 2014/0204017 A1* | 7/2014 | Wu | G06F 1/1694 | 345/156 |
| 2014/0244712 A1* | 8/2014 | Walters | H04L 67/10 | 709/202 |
| 2014/0273987 A1* | 9/2014 | Price | H04L 51/12 | 455/414.1 |
| 2015/0002423 A1* | 1/2015 | Chen | G06F 3/041 | 345/173 |
| 2015/0007289 A1* | 1/2015 | Godse | G06F 21/31 | 726/7 |
| 2015/0040209 A1* | 2/2015 | Garg | G06F 21/31 | 726/16 |
| 2015/0242601 A1* | 8/2015 | Griffiths | G06F 21/305 | 726/5 |
| 2015/0248551 A1* | 9/2015 | Bae | G06F 21/36 | 726/30 |
| 2015/0312719 A1* | 10/2015 | Cho | H04W 4/027 | 455/456.5 |
| 2016/0055328 A1* | 2/2016 | Shen | H04L 9/0866 | 713/168 |
| 2016/0173493 A1* | 6/2016 | Wane | H04M 15/63 | 380/249 |
| 2016/0180073 A1* | 6/2016 | Zhou | H04L 63/0876 | 726/27 |
| 2016/0180083 A1* | 6/2016 | Costigan | G06F 21/55 | 726/23 |
| 2016/0286401 A1* | 9/2016 | Rahman | H04W 12/06 | |
| 2017/0098068 A1* | 4/2017 | Mantri | G06F 21/36 | |

OTHER PUBLICATIONS

Anonymous, "Method for Creating and Authenticating Signatures on a Portable Device using Sensors of the Portable Device," IP.com Prior Art Database Technical Disclosure, 2013, pp. 1-3.

Anonymous, "Apparatus for Securely Transmitting Device Secrets to a Smart Device Using Motion Sensors," IP.com Prior Art Database Technical Disclosure, 2012, pp. 1-7.

Miller, "Facebook Companion," Wiley Publishing, Inc. 2011, Ch. 9, pp. 145.

MotionCAPTCHA v0.2, Retrieved From http://www.josscrowcroft.com/demos/motioncaptcha/ on May 5, 2016.

* cited by examiner

VERIFYING A USER UTILIZING GYROSCOPIC MOVEMENT

BACKGROUND

The present invention relates to user verification, and more specifically, this invention relates to verifying a user utilizing gyroscopic movement of a device.

The ability to verify a presence of a human operator of a device is of high importance. For example, many services may desire a confirmation that received input comes from a human operator and not a machine. However, current methods for differentiating between human and machine input are intrusive, cumbersome, and fail to integrate deeply with a native operating system (OS) of a device. Current verification methods also are easily solved via advanced image processing algorithms and other means.

SUMMARY

A computer-implemented method according to one embodiment includes requesting input from a user of a mobile device, receiving gyroscope data at the mobile device, in response to the requesting, verifying the gyroscope data, and performing one or more actions, in response to the verifying.

According to another embodiment, a computer program product for verifying a user of a mobile device comprises a computer readable storage medium having program instructions embodied therewith, wherein the computer readable storage medium is not a transitory signal per se, and where the program instructions are executable by a processor to cause the processor to perform a method comprising requesting input from the user of the mobile device, utilizing the processor, receiving, utilizing the processor, gyroscope data at the mobile device, in response to the requesting, verifying the gyroscope data, utilizing the processor, and performing, utilizing the processor, one or more actions, in response to the verifying.

A system according to another embodiment includes a processor and logic integrated with and/or executable by the processor, where the logic is configured to request input from a user of a mobile device, receive gyroscope data at the mobile device, in response to the request, verify the gyroscope data, and perform one or more actions, in response to the verification.

Other aspects and embodiments of the present invention will become apparent from the following detailed description, which, when taken in conjunction with the drawings, illustrate by way of example the principles of the invention.

DETAILED DESCRIPTION

The following description discloses several preferred embodiments of systems, methods and computer program products for verifying a user utilizing gyroscopic movement. Various embodiments provide a method to create and utilize a profile to assist in providing accurate recommendations to a user.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for verifying a user utilizing gyroscopic movement.

In one general embodiment, a computer-implemented method includes requesting input from a user of a mobile device, receiving gyroscope data at the mobile device, in response to the requesting, verifying the gyroscope data, and performing one or more actions, in response to the verifying.

In another general embodiment, a computer program product for verifying a user of a mobile device comprises a computer readable storage medium having program instructions embodied therewith, wherein the computer readable storage medium is not a transitory signal per se, and where the program instructions are executable by a processor to cause the processor to perform a method comprising requesting input from the user of the mobile device, utilizing the processor, receiving, utilizing the processor, gyroscope data at the mobile device, in response to the requesting, verifying the gyroscope data, utilizing the processor, and performing, utilizing the processor, one or more actions, in response to the verifying.

In another general embodiment, a system includes a processor and logic integrated with and/or executable by the processor, where the logic is configured to request input from a user of a mobile device, receive gyroscope data at the mobile device, in response to the request, verify the gyroscope data, and perform one or more actions, in response to the verification.

Figure 1:
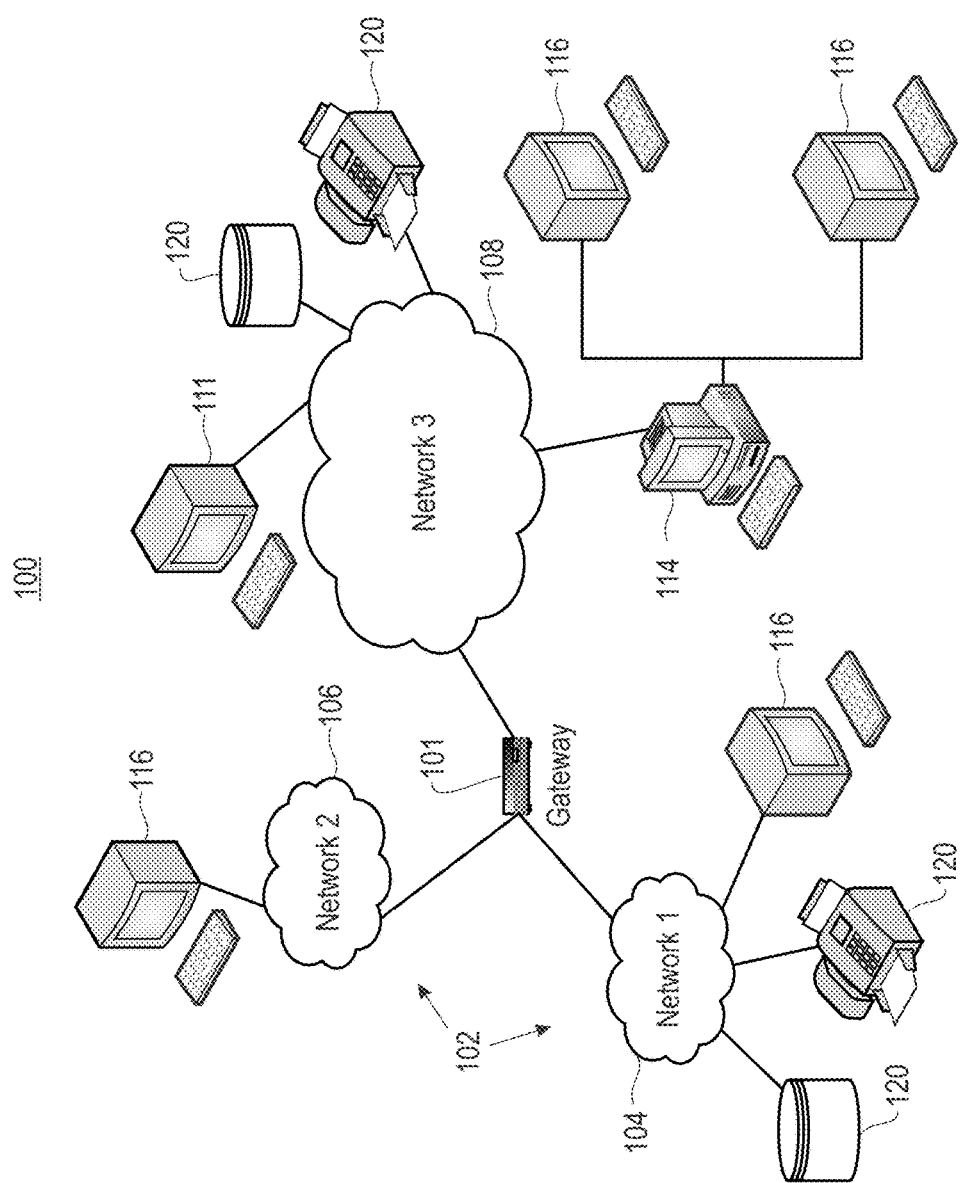
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
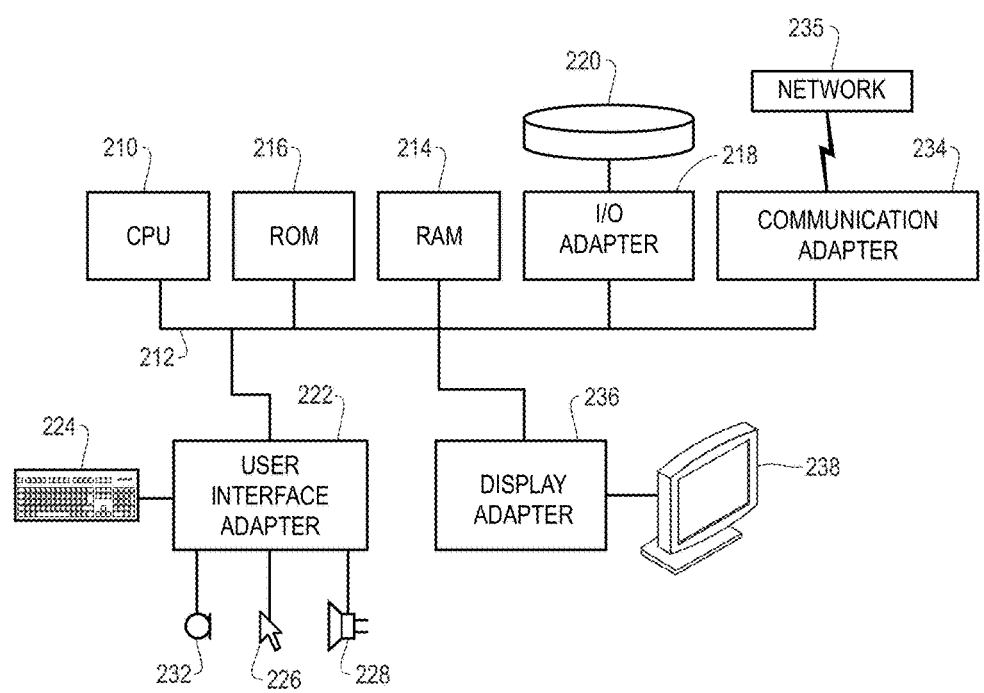
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
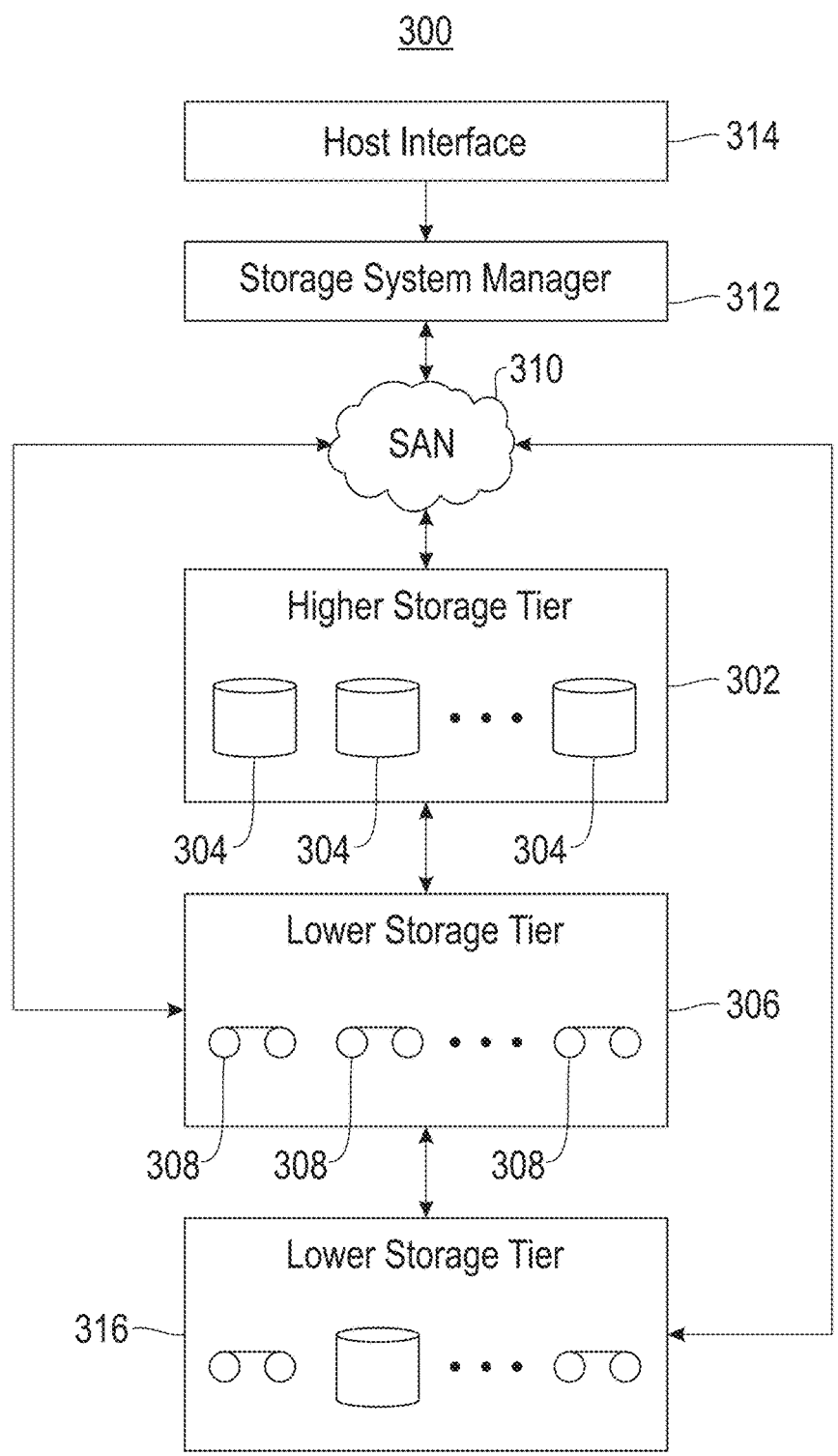
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
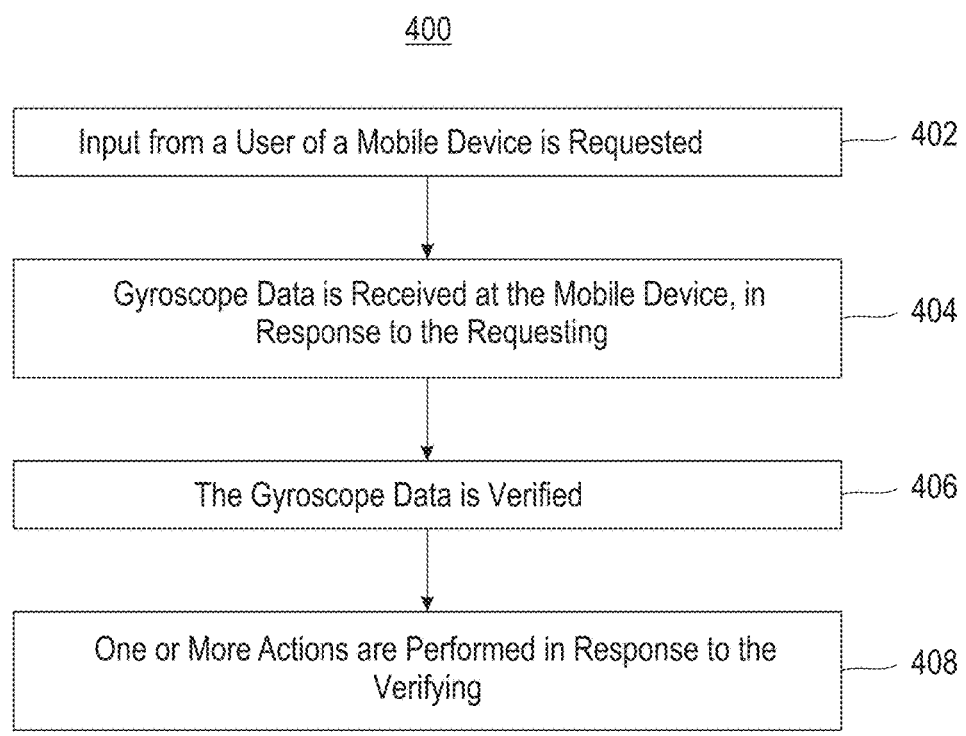
FIG. 4 illustrates a method for verifying a user utilizing gyroscopic movement, in accordance with one embodiment.

Now referring to FIG. 4, a flowchart of a method 400 is shown according to one embodiment. The method 400 may be performed in accordance with the present invention in any of the environments depicted in FIGS. 1-3 and 5, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where input from a user of a mobile device is requested. In one embodiment, the mobile device may include a mobile computing device such as a tablet computer, a mobile telephone, a personal digital assistant (PDA), a laptop computer, etc. In another embodiment, the input may be requested utilizing the mobile device.

Additionally, in one embodiment, requesting the input may include displaying one or more images to the user utilizing a display of the mobile device of the user (e.g. a screen of the mobile device, etc.). For example, a requested movement of the mobile device may be displayed by the mobile device. For instance, the requested movement may include one or more paths (e.g., one or more shapes, letters, patterns) to be replicated by the user using the mobile device. In another embodiment, the one or more paths may be two dimensional, three dimensional, etc.

Further, in one embodiment, requesting the input may include displaying an image or video by the mobile device, where the image or video indicates a requested movement of the mobile device by the user. In another embodiment, requesting the input may include outputting one or more audio signals to the user, using the mobile device. For example, one or more audible commands that request a movement of the mobile device may be output via one or more speakers of the mobile device.

Further still, in one embodiment, requesting the user input may include outputting one or more tactile signals to the user, using the mobile device. For example, one or more tactile commands (e.g., vibrations, etc.) may be output via one or more motors of the mobile device, one or more servos of the mobile device, etc. In another embodiment, the input may be requested and received by the mobile device when the mobile device is online, when the mobile device is offline (e.g., without access to a server or network, etc.), etc.

Also, in one embodiment, the input may be requested in response to a request to verify the user of the device. For example, the request to verify the user of the device may include a request to verify a human operator of the device that is made in response to an identification of an attempt to purchase a good or service using the mobile device, an attempt to access data using the mobile device, an attempt to access an application using the mobile device, etc. In one embodiment, the identification of the attempt may be made by the mobile device or by another device separate from the mobile device. In another example, the request to verify the user of the device may be created by the mobile device or may be received by the mobile device from a device other than the mobile device (e.g., as part of a challenge and response question, etc.).

In addition, as shown in FIG. 4, method 400 may proceed with operation 404, where gyroscope data is received at the mobile device, in response to the requesting. In one embodiment, the gyroscope data may include data created utilizing a hardware gyroscope of the mobile device. For example, the gyroscope may include one or more hardware sensors located within the mobile device that measure a rotation of the device around an axis (e.g., an angular rotational velocity, etc.), detect an orientation of the device (e.g., with respect to a predetermined plane, etc.), etc.

Furthermore, in one embodiment, the gyroscope data may be created in response to one or more movements of the mobile device by the user. For example, the gyroscope data may be created in response to a tilting of the device by the user, a rotating of the device by the user, a three-dimensional manipulation of the device by the user, etc.

Further still, as shown in FIG. 4, method 400 may proceed with operation 406, where the gyroscope data is verified. In one embodiment, verifying the gyroscope data may include comparing the gyroscope data to predetermined data. For example, the predetermined data may indicate a desired movement or movements of the mobile device. In another embodiment, the results of the comparing may include an accuracy of the gyroscope data (e.g., how accurate the gyroscope data is when compared to the predetermined data, etc.). In yet another embodiment, verification of the gyroscope data may be successful when the gyroscope data has an accuracy that exceeds a predetermined threshold.

Also, in one embodiment, the verifying of the gyroscope data may be performed by the mobile device. In another embodiment, the verifying of the gyroscope data may be performed by a device other than the mobile device. For example, the gyroscope data may be sent to a location other than the mobile device to be compared to the predetermined data.

Additionally, as shown in FIG. 4, method 400 may proceed with operation 408, where one or more actions are performed in response to the verifying. In one embodiment, the one or more actions may be performed by the mobile device. In another embodiment, the one or more actions may include allowing the performance of a requested activity, utilizing the mobile device, when it is determined that the verification is successful. For example, in response to a successful verification, a good or service may be purchased using the device, data or an application may be accessed using the device, etc.

In yet another embodiment, the one or more actions may include preventing the performance of the requested activity, utilizing the mobile device, when it is determined that the verification is unsuccessful. For example, in response to an unsuccessful verification, a purchase of a good or service may be prevented using the device, an access of data or an application may be prohibited using the device, etc.

Further, in one embodiment, the one or more actions may include sending a response from the mobile device to another device, when it is determined that the verification is successful. For example, the one or more actions may include sending a valid response from the mobile device to another device separate from the mobile device as part of a challenge and response sequence with the other device, in response to a successful verification (e.g., as part of a CAPTCHA test, etc.). In another embodiment, the one or more actions may include sending a verification failure notice to another device, utilizing the mobile device, when it is determined that the verification is unsuccessful. For example, the one or more actions may include sending an invalid response from the mobile device to another device separate from the mobile device as part of a challenge and response sequence with the other device, in response to a successful verification.

In this way, the gyroscope of the mobile device may be used to verify the user of the mobile device.

Figure 5:
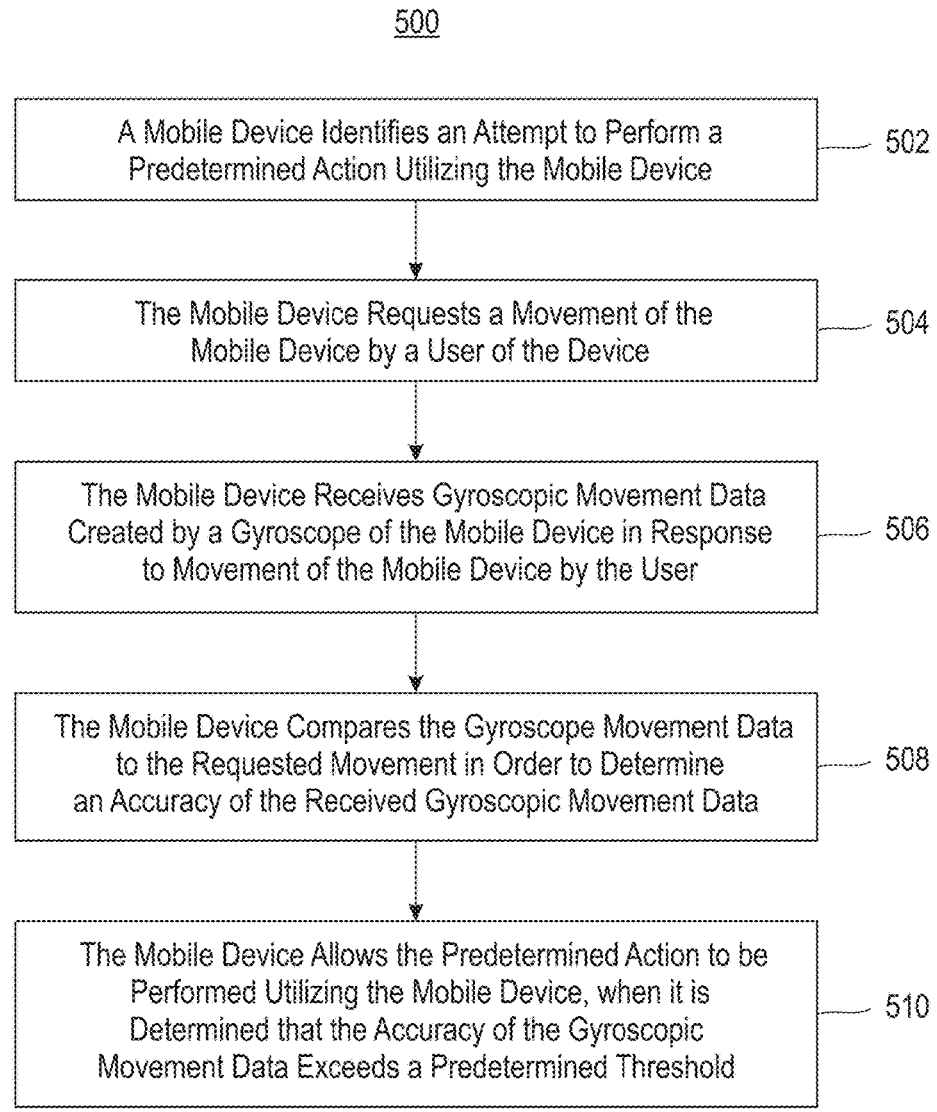
FIG. 5 illustrates a method for verifying a presence of a human operator of a mobile device, in accordance with one embodiment.

Now referring to FIG. 5, a flowchart of a method 500 for verifying a presence of a human operator of a mobile device is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a mobile device identifies an attempt to perform a predetermined action utilizing the mobile device. In one embodiment, the predetermined action may include viewing data stored within the mobile device, sending data such as an email using the mobile device, purchasing a good or service using the mobile device, accessing predetermined software within the mobile device, accessing a web page utilizing the mobile device, etc.

Additionally, method 500 may proceed with operation 504, where the mobile device requests a movement of the mobile device by a user of the device. In one embodiment, the requested movement may be presented visually, audibly, tactilely, etc. For example, the user may be required to trace out a shape presented on a screen of the mobile device. In another embodiment, the requested movement may be presented to the user in response to a determination by the mobile device that the mobile device is in the hands of the user (e.g., by using gyroscopic feedback data created by a gyroscope within the mobile device, etc.).

Further, in one embodiment, the mobile device may audibly dictate a shape to be drawn by the user using the mobile device (e.g., by explicitly stating the shape, by suggesting the correct motion, etc.). In another embodiment, audible dictation may be enabled by the mobile device by reading accessibility settings stored within the mobile device. In yet another embodiment, the requested movement may correspond to a planar shape (e.g., a square, a circle, etc.). In still another embodiment, the requested movement may correspond to a non-planar, three-dimensional shape (e.g., a sphere, a cube, etc.). In this way, the mobile device may implement a user verification system utilizing little, if any, screen space on the mobile device.

Further still, method 500 may proceed with operation 506, where the mobile device receives gyroscopic movement data created by a gyroscope of the mobile device in response to movement of the mobile device by the user. In one embodiment, the movement of the mobile device by the user may include a manipulation of the mobile device by the user (e.g., tilting the mobile device, rotating the mobile device, etc.). In another embodiment, tactile and/or visual feedback may be provided by the mobile device to assist the movement of the mobile device by the user. For example, an image displayed by the mobile device may trace the requested movement as the user manipulates the mobile device. In another example, the mobile device may vibrate when all or a portion of the requested movement is achieved by the movement of the mobile device by the user, then the movement of the mobile device by the user deviates from the requested movement by a predetermined amount, etc.

Also, method 500 may proceed with operation 508, where the mobile device compares the gyroscopic movement data to the requested movement in order to determine an accuracy of the received gyroscopic movement data.

In addition, method 500 may proceed with operation 510, where the mobile device allows the predetermined action to be performed utilizing the mobile device, when it is determined that the accuracy of the gyroscopic movement data exceeds a predetermined threshold. In one embodiment, the mobile device may determine that verification is successful when the gyroscopic movement data matches the requested movement with a predetermined percentage of accuracy.

Furthermore, in one embodiment, the mobile device may prevent the predetermined action from being performed utilizing the mobile device, when it is determined that the accuracy of the gyroscopic movement data does not exceed the predetermined threshold. In another embodiment, the mobile device may be offline (e.g., not connected to a communications network, etc.) during all or a portion of the aforementioned method. In yet another embodiment, the mobile device may be located in a means of transportation that creates a change in gravity with respect to the mobile device (e.g., an airplane that is currently in flight, etc.) during all or a portion of the aforementioned method.

In this way, the gyroscope of the mobile device may confirm a human operator of the mobile device with high certainty, while verifying the integrity of the mobile device and minimizing interference with a display of the mobile device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
attempting to access a web page, utilizing a mobile device;
receiving, via a network from a device other than the mobile device, a request to verify a user of the mobile device in response to the attempting, where the request is included within a CAPTCHA challenge and response sequence between the mobile device and the device other than the mobile device;
requesting, based on the request to verify the user of the mobile device, input from the user of the mobile device while the mobile device is disconnected from the network, the requesting including audibly stating a three-dimensional shape to be drawn by the user using the mobile device;
receiving gyroscope data at the mobile device while the mobile device is disconnected from the network, in response to the requesting, the gyroscope data indicating a three-dimensional movement of the mobile device by the user;
verifying the gyroscope data; and
performing one or more actions, in response to the verifying, the one or more actions including sending, via the network, a valid response to the device other than the mobile device as part of the CAPTCHA challenge and response sequence.

2. The computer-implemented method of claim 1, wherein requesting the input further includes displaying one or more images to the user utilizing a display of the mobile device, and requesting a three-dimensional path to be replicated by the user using the mobile device.

3. The computer-implemented method of claim 1, further comprising providing tactile feedback to the user of the mobile device to assist the three-dimensional movement of the mobile device by the user, the tactile feedback including a vibration of the mobile device in response to determining that the three-dimensional movement of the mobile device deviates by a predetermined amount from the input requested from the user.

4. The computer-implemented method of claim 1, wherein requesting the input from the user of the mobile device, receiving the gyroscope data at the mobile device, and verifying the gyroscope data are performed while the mobile device is located in a means of transportation that creates a change in gravity with respect to the mobile device.

5. The computer-implemented method of claim 1, wherein the gyroscope data includes data created utilizing a hardware gyroscope of the mobile device, including an angular rotational velocity and an orientation of the device with respect to a predetermined plane.

6. The computer-implemented method of claim 1, further comprising determining that the mobile device is being held by the user, utilizing gyroscopic feedback data, and requesting the input from the user of the mobile device in response to determining that the mobile device is being held by the user.

7. The computer-implemented method of claim 1, wherein verifying the gyroscope data includes comparing the gyroscope data to predetermined data indicating a desired movement or movements of the mobile device.

8. The computer-implemented method of claim 1, wherein the verifying of the gyroscope data is successful when the gyroscope data has an accuracy that exceeds a predetermined threshold.

9. The computer-implemented method of claim 1, wherein the one or more actions include preventing the performance of a requested activity, including preventing the access of the web page utilizing the mobile device, when it is determined that the verifying is unsuccessful.

10. A computer program product for verifying a user of a mobile device, the computer program product comprising a computer readable storage medium having program instructions embodied therewith, wherein the computer readable storage medium is not a transitory signal per se, the program instructions executable by a processor to cause the processor to perform a method comprising:
attempting to access a web page, utilizing the mobile device;
receiving, via a network from a device other than the mobile device a request to verify the user of the mobile device in response to the attempting, utilizing the processor, where the request is included within a CAPTCHA challenge and response sequence between the mobile device and the device other than the mobile device;
requesting, based on the request to verify the user of the mobile device, input from the user of the mobile device while the mobile device is disconnected from the network, the requesting including audibly stating a three-dimensional shape to be drawn by the user using the mobile device, utilizing the processor;
receiving, utilizing the processor, gyroscope data at the mobile device while the mobile device is disconnected from the network, in response to the requesting, the gyroscope data indicating a three-dimensional movement of the mobile device by the user;
verifying the gyroscope data, utilizing the processor; and
performing, utilizing the processor, one or more actions, in response to the verifying, the one or more actions including sending, via the network, a valid response to the device other than the mobile device as part of the CAPTCHA challenge and response sequence.

11. The computer program product of claim 10, wherein requesting the input further includes displaying, utilizing the processor, one or more images to the user utilizing a display of the mobile device.

12. The computer program product of claim 10, further comprising providing, utilizing the processor, tactile feedback to the user of the mobile device to assist the three-dimensional movement of the mobile device by the user, the tactile feedback including a vibration of the mobile device in response to determining that the three-dimensional movement of the mobile device deviates by a predetermined amount from the input requested from the user.

13. The computer program product of claim 10, wherein the mobile device is located in a means of transportation that creates a change in gravity with respect to the mobile device.

14. The computer program product of claim 10, wherein the gyroscope data includes data created utilizing a hardware gyroscope of the mobile device.

15. The computer program product of claim 10, further comprising determining, utilizing the processor, that the mobile device is being held by the user, utilizing gyroscopic feedback data, and requesting the input from the user of the mobile device in response to determining that the mobile device is being held by the user.

16. The computer program product of claim 10, wherein verifying the gyroscope data includes comparing, utilizing the processor, the gyroscope data to predetermined data indicating a desired movement or movements of the mobile device.

17. The computer program product of claim 10, wherein the verifying of the gyroscope data is successful when the gyroscope data has an accuracy that exceeds a predetermined threshold.

18. A system, comprising:
a processor; and
logic integrated with the processor, logic executable by the processor, or logic integrated with and executable by the processor, the logic being configured to:
attempt to access a web page, utilizing a mobile device;
receive, via a network from a device other than the mobile device, a request to verify a user of the mobile device in response to the attempt, where the request is included within a CAPTCHA challenge and response sequence between the mobile device and the device other than the mobile device;
request, based on the request to verify the user of the mobile device, input from the user of the mobile device while the mobile device is disconnected from the network, the request including audibly stating a three-dimensional shape to be drawn by the user using the mobile device;
receive gyroscope data at the mobile device while the mobile device is disconnected from the network, in response to the request, the gyroscope data indicating a three-dimensional movement of the mobile device by the user;
verify the gyroscope data; and
perform one or more actions, in response to the verification, the one or more actions including sending, via the network, a valid response to the device other than the mobile device as part of the CAPTCHA challenge and response sequence.

\* \* \* \* \*